United States Patent
Sakai et al.

(10) Patent No.: US 11,766,923 B2
(45) Date of Patent: Sep. 26, 2023

(54) GLASS PLATE MODULE

(71) Applicant: NIPPON SHEET GLASS COMPANY, LIMITED, Tokyo (JP)

(72) Inventors: Tsuneaki Sakai, Tokyo (JP); Yoshimitsu Matsushita, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/474,972

(22) Filed: Sep. 14, 2021

(65) Prior Publication Data

US 2021/0402858 A1 Dec. 30, 2021

Related U.S. Application Data

(63) Continuation of application No. 16/477,070, filed as application No. PCT/JP2018/000455 on Jan. 11, 2018, now Pat. No. 11,142,054.

(30) Foreign Application Priority Data

Jan. 11, 2017 (JP) ................................. 2017-002855

(51) Int. Cl.
*E06B 7/22* (2006.01)
*B60J 10/246* (2016.01)
(Continued)

(52) U.S. Cl.
CPC ............... *B60J 10/246* (2016.02); *B60J 1/10* (2013.01); *B60J 10/16* (2016.02); *B60J 10/70* (2016.02); *B60J 10/84* (2016.02); *B60J 10/35* (2016.02)

(58) Field of Classification Search
CPC . B60J 10/246; B60J 10/16; B60J 10/70; B60J 10/84; B60J 10/35; B60J 10/24; B60J 10/277; B60J 1/10; B60J 1/085
(Continued)

(56) References Cited

U.S. PATENT DOCUMENTS 2,963,754 A 12/1960 Herman
2,988,788 A 6/1961 Saponara
(Continued)

FOREIGN PATENT DOCUMENTS

CN 1590145 A 3/2005
CN 102407757 A 4/2012
(Continued)

OTHER PUBLICATIONS

Chinese Office Action and Search Report for Chinese Application No. 201880006563.8, dated Jul. 15, 2022, with English translation of Chinese Office Action.
(Continued)

*Primary Examiner* — Jerry E Redman
(74) *Attorney, Agent, or Firm* — Birch, Stewart, Kolasch & Birch, LLP

(57) ABSTRACT

A glass plate module according to the present invention is a glass plate module to be attached at a position adjacent to a door of a vehicle that can be opened and closed, and the glass plate module includes a glass plate, a window assembly that is fixed to a peripheral edge of the glass plate, and a molding portion that includes a tubular molding portion main body provided with a through hole extending along the window assembly, and is fixed to the window assembly. The molding portion main body is configured to come into contact with a portion of the closed door.

7 Claims, 4 Drawing Sheets

(51) Int. Cl.
  *B60J 10/16* (2016.01)
  *B60J 10/70* (2016.01)
  *B60J 10/84* (2016.01)
  *B60J 1/10* (2006.01)
  *B60J 10/35* (2016.01)

(58) Field of Classification Search
  USPC ........................................................ 49/498.1
  See application file for complete search history.

(56) References Cited

U.S. PATENT DOCUMENTS

| | | | |
|---|---|---|---|
| 4,312,534 A | 1/1982 | Jardin et al. | |
| 4,603,899 A * | 8/1986 | Iwasa | B60J 10/17 |
| | | | 428/188 |
| 4,676,493 A | 6/1987 | Helbig | |
| 4,826,232 A * | 5/1989 | Wissler | B60J 10/277 |
| | | | 156/303.1 |
| 4,987,671 A | 1/1991 | Clausen-Schaumann | |
| 5,001,865 A * | 3/1991 | Procton | E06B 1/70 |
| | | | 49/489.1 |
| 5,248,179 A | 9/1993 | Biermacher et al. | |
| 5,366,267 A | 11/1994 | Nozaki | |
| 6,076,886 A | 6/2000 | Petri et al. | |
| 6,487,823 B2 | 12/2002 | Lagrue | |
| 6,491,334 B1 * | 12/2002 | Anders | B60J 10/30 |
| | | | 296/107.07 |
| 6,896,268 B2 | 5/2005 | Hofmann et al. | |
| 7,837,251 B2 * | 11/2010 | Rich | B60J 10/24 |
| | | | 49/490.1 |
| 8,028,640 B2 | 10/2011 | Griffith et al. | |
| 8,516,749 B2 | 8/2013 | Ash et al. | |
| 8,667,740 B1 | 3/2014 | Hashimoto et al. | |
| 8,881,465 B2 * | 11/2014 | Lee | B60J 10/24 |
| | | | 49/489.1 |
| 9,849,821 B1 | 12/2017 | Copp et al. | |
| 10,035,410 B2 * | 7/2018 | Taketomo | B60J 10/16 |
| 10,654,346 B2 | 5/2020 | Copp et al. | |
| 11,142,054 B2 * | 10/2021 | Sakai | B60J 10/246 |
| 2004/0137197 A1 | 7/2004 | Watanabe | |
| 2006/0005472 A1 * | 1/2006 | Miller | E06B 7/2303 |
| | | | 49/498.1 |
| 2013/0160375 A1 * | 6/2013 | Kuwabara | B60J 10/79 |
| | | | 49/490.1 |
| 2014/0170357 A1 | 6/2014 | Tooker et al. | |
| 2015/0007504 A1 | 1/2015 | Inai | |
| 2015/0076856 A1 * | 3/2015 | Masumoto | B60J 10/277 |
| | | | 296/216.06 |
| 2015/0082710 A1 | 3/2015 | Hamada et al. | |
| 2015/0143753 A1 | 5/2015 | Kim | |

FOREIGN PATENT DOCUMENTS

| | | | | |
|---|---|---|---|---|
| DE | 10005642 B4 * | 4/2004 | | B60J 10/246 |
| EP | 296901 A * | 12/1988 | | B60J 10/0005 |
| EP | 1241037 A1 | 9/2002 | | |
| GB | 2199067 A * | 6/1988 | | B60J 10/24 |
| JP | 2012-66753 A | 4/2012 | | |
| JP | 2013-71582 A | 4/2013 | | |
| JP | 2013-226947 A | 11/2013 | | |
| JP | 2015-13510 A | 1/2015 | | |
| JP | 2016-52826 A | 4/2016 | | |
| WO | WO 2011/128878 A | 10/2011 | | |

OTHER PUBLICATIONS

Extended European Search Report, dated Sep. 24, 2020, for European Application No. 18739124.8.
International Search Report issued in PCT/JP2018/000455 (PCT/ISA/210), dated Feb. 13, 2018.
Office Action issued in Japanese Patent Application No. 2018-561410 dated Aug. 17, 2021.
Written Opinion of the International Searching Authority issued in PCT/JP2018/000455 (PCT/ISA/237), dated Feb. 13, 2018.

* cited by examiner

GLASS PLATE MODULE

CROSS-REFERENCE TO RELATED APPLICATIONS

This application is a Continuation of application Ser. No. 16/477,070, now U.S. Pat. No. 11,142,054, filed on Aug. 6, 2019, which was filed as PCT International Application No. PCT/JP2018/000455 on Jan. 11, 2018, which claims the benefit under 35 U.S.C. § 119(a) to Patent Application No. 2017-002855, filed in Japan on Jan. 11, 2017, all of which are hereby expressly incorporated by reference into the present application.

TECHNICAL FIELD

The present invention relates to a glass plate module.

BACKGROUND ART

Various fixed windows for vehicles have been proposed, and a fixed window disclosed in Patent Literature 1 is an example thereof. This fixed window is fixed to a vehicle body via a weather strip that is attached to the periphery of a glass plate.

CITATION LIST

Patent Literature

Patent Literature 1: JP 2012-66753A

SUMMARY OF INVENTION

Technical Problem

Some of the fixed windows as mentioned above are attached to a vehicle body at a position adjacent to a door that can be opened and closed. Accordingly, a rubber lip or resin lip for preventing infiltration of rainwater and the like is attached to a portion of the fixed window that hits the door. However, providing such a lip poses a problem in that collision between the door and the lip causes loud collision noise, and there has been demand to reduce this collision noise.

The present invention was made in order to solve the foregoing problem, and it is an object thereof to provide a glass plate module that can reduce door impact noise.

Solution to Problem

A glass plate module according to the present invention is a glass plate module to be attached at a position adjacent to a door of a vehicle that can be opened and closed, the glass plate module including a glass plate, a window assembly that is fixed to a peripheral edge of the glass plate, and a molding portion that includes a tubular molding portion main body provided with a through hole extending along the window assembly and that is fixed to the window assembly, wherein the molding portion main body is configured to come into contact with a portion of the closed door.

This configuration includes the tubular molding portion main body that comes into contact with a portion of a closed door and is provided with the through hole, and therefore, impact can be absorbed by the molding portion main body when the door is closed. That is, since the molding portion main body is provided with the through hole, the molding portion main body can be easily deformed when the door hits the molding portion main body, thus making it possible to reduce door collision noise.

In the above-mentioned glass plate module, a cutout portion that extends along the window assembly can be formed in an inner wall surface of the through hole of the molding portion main body.

With this configuration, the cutout portion is formed in the inner wall surface of the through hole, and therefore, reaction force generated by the deformation of the molding portion main body can be reduced, thus making it possible to further reduce the collision noise.

In the above-mentioned glass plate module, the molding portion can further include a coupling portion that couples the molding portion main body to the window assembly, the coupling portion includes a flat surface that extends along the window assembly, and the window assembly can include a flat surface to which the flat surface of the coupling portion is bonded.

Accordingly, the window assembly and the molding portion are fixed to each other by bonding the respective flat surfaces thereof together, thus making it possible to attach the molding portion easily and firmly.

In the above-mentioned glass plate module, the molding portion can be made of a foamable material.

Accordingly, the molding portion can be more easily deformed. As a result, door impact can be further absorbed, thus making it possible to further mitigate the collision noise.

In the above-mentioned glass plate module, an abrasion-resistant coating can be applied to the molding portion.

Accordingly, abrasion of the molding portion can be suppressed even if the molding portion receives impact from the door many times. Therefore, impact resistance of the molding portion can be maintained.

In the above-mentioned glass plate module, at least one rib that extends along the through hole can be formed on the molding portion, and the rib can be configured to come into contact with a vehicle body of the vehicle.

In the above-mentioned glass plate module, there is no particular limitation on the outline shape of the cross section of the molding portion main body, and examples thereof include a triangular shape, a circular shape, an elliptical shape, and a polygonal shape.

Advantageous Effects of the Invention

With the glass plate module according to the present invention, door impact noise can be reduced.

DESCRIPTION OF EMBODIMENTS

Figure 1:
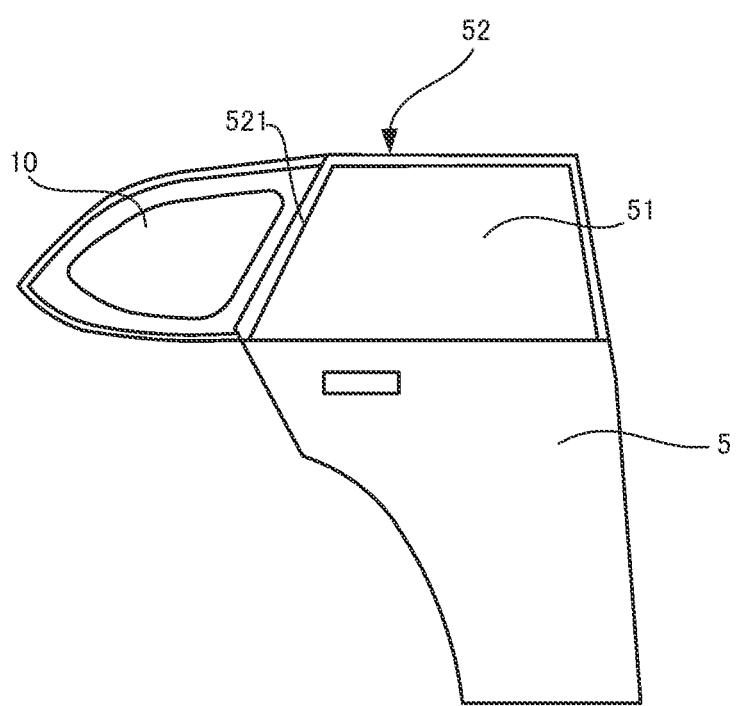
FIG. 1 is a diagram showing the vicinity of a rear portion of a vehicle, to which a glass plate module according to the present invention is attached.
Figure 2:
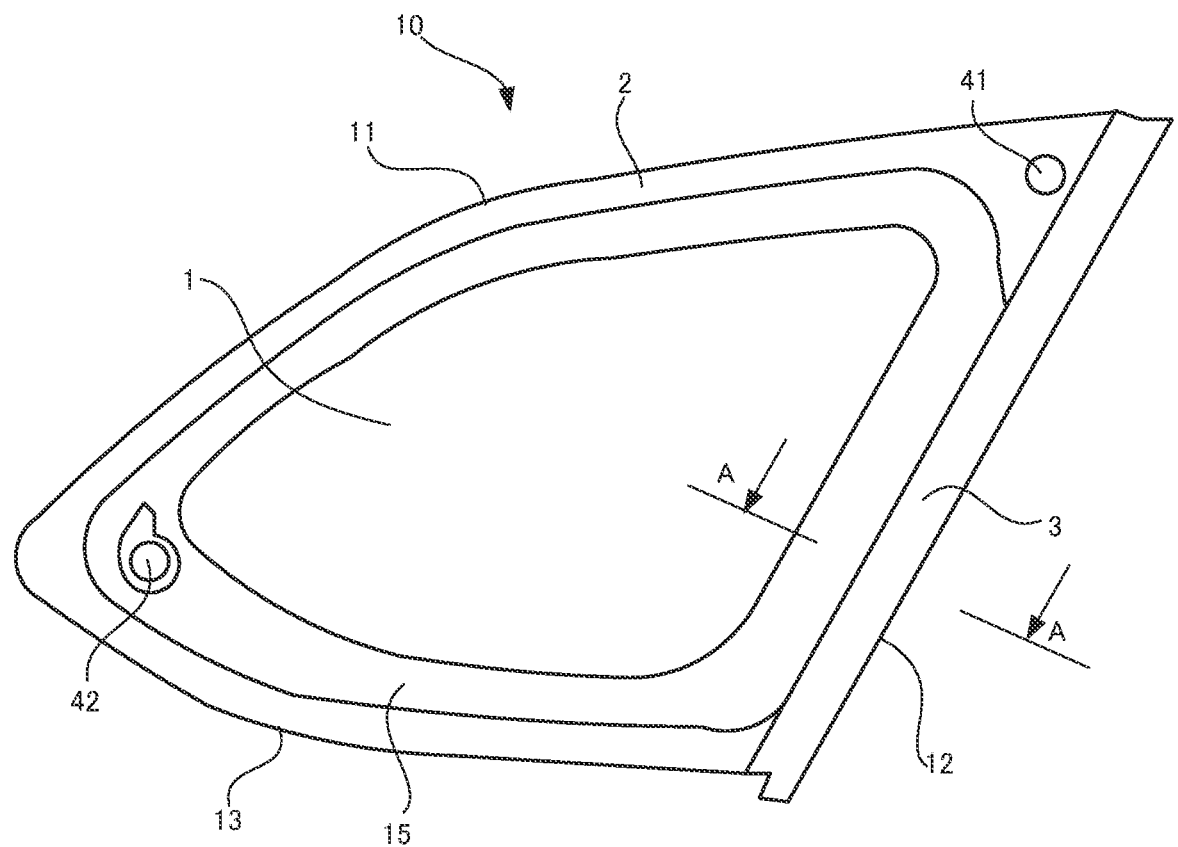
FIG. 2 is a plan view of an embodiment of the glass plate module according to the present invention.

Hereinafter, an embodiment in which a glass plate module according to the present invention is applied to a fixed window for a rear portion of a vehicle will be described with reference to the drawings. FIG. 1 is a diagram showing the vicinity of a rear portion of a vehicle, to which a glass plate module according to this embodiment is attached, FIG. 2 is a plan view of the glass plate module as viewed from the vehicle interior side, FIG. 3 is a cross-sectional view taken along line A-A in FIG. 2, showing a state in which a door is open, and FIG. 4 is a cross-sectional view taken along line A-A in FIG. 2, showing a state in which the door is closed.

As shown in FIG. 1, a glass plate module 10 according to this embodiment constitutes a fixed window that is arranged to be adjacent to a windowpane 51 of a rear door 5 located on a lateral side of a vehicle body. The following is a more detailed description. The windowpane 51 of the rear door 5 is formed in a rectangular shape, and a window frame 52 is formed so as to surround the front side, the upper side, and the rear side of this windowpane 51. A rear pillar 521 of the window frame 52 that extends along the rear side of the windowpane 51 is adjacent to the above-mentioned glass plate module 10.

Figure 3:
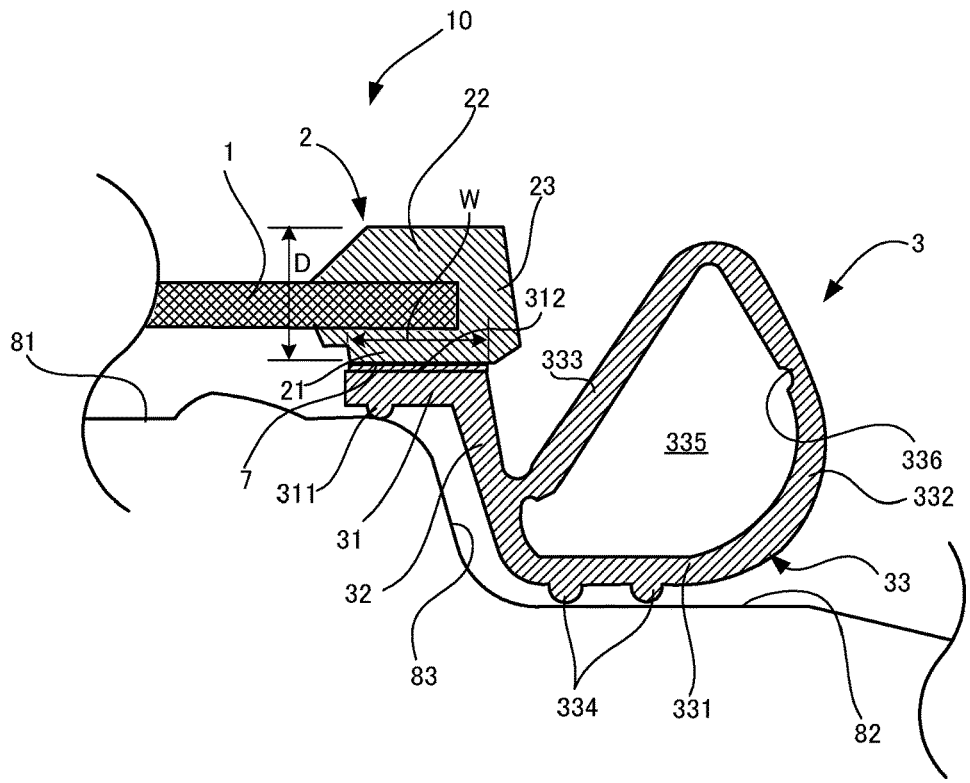
FIG. 3 is a cross-sectional view taken along line A-A in FIG. 2 in a state in which a door is open.
Figure 4:
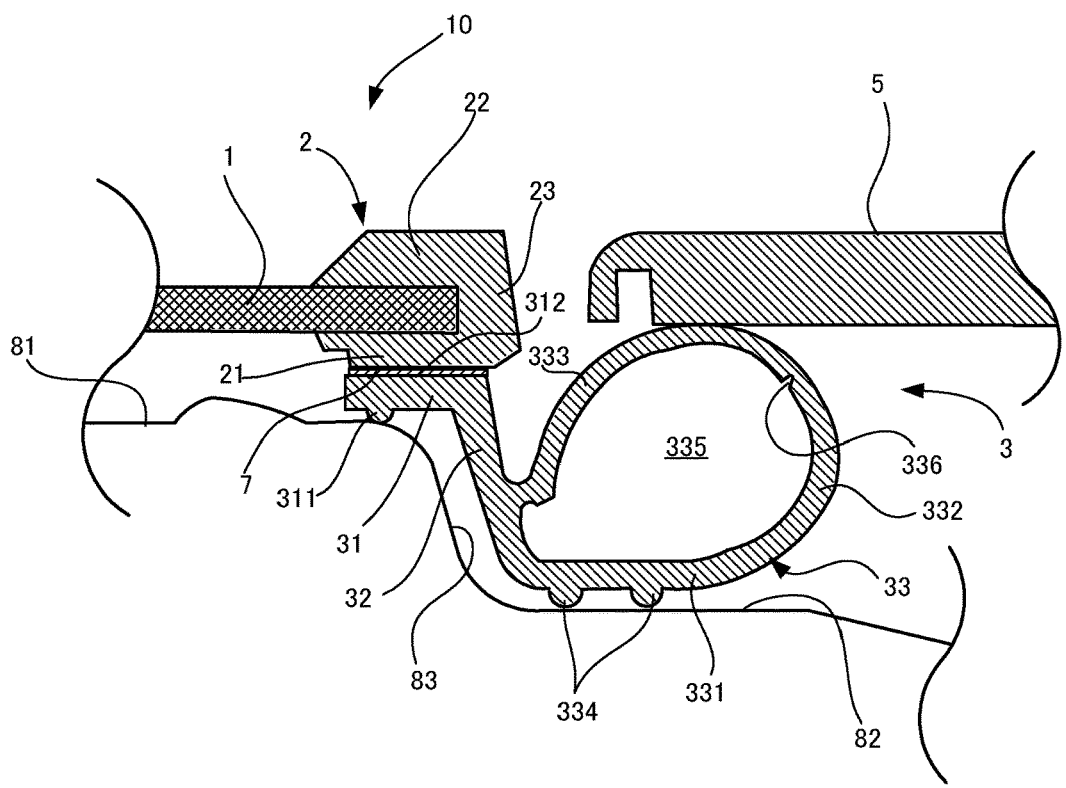
FIG. 4 is a cross-sectional view taken along line A-A in FIG. 2 in a state in which the door is closed.

As shown in FIGS. 3 and 4, a triangular attachment recessed portion 81, to which the glass plate module 10 is to be attached, is formed on the lateral side of the vehicle body, and one side of this attachment recessed portion 81 is adjacent to the rear pillar 521 of the rear door 5. A door arrangement portion 82 in which the rear end portion of the rear door 5 including the rear pillar 521 is to be arranged is formed adjacent to this attachment recessed portion 81 in the vehicle body. The door arrangement portion 82 is formed so as to be recessed toward the vehicle interior side relative to the attachment recessed portion 81, and is continuous with the attachment recessed portion 81 via a linking portion 83. Accordingly, the attachment recessed portion 81 and the door arrangement portion 82 are coupled to each other and forma step portion therebetween. As described later, in a state in which the rear door 5 is closed, that is, in a state in which the rear pillar 521 of the rear door 5 is arranged at the door arrangement portion 82, the rear pillar 521 is in contact with a molding portion 3 of the glass plate module 10. The glass plate module will be described in detail below.

1. Overview of Glass Plate Module

As shown in FIG. 2, the glass plate module 10 includes a glass plate 1, a window assembly 2 attached to the glass plate 1 so as to extend along the peripheral edge thereof, a molding portion 3 attached to a portion of the window assembly 2, and a fixing protrusions 41 and 42 for fixing the glass plate module 10 to the attachment recessed portion 81. First, the glass plate 1 will be described.

1-1. Glass Plate

As shown in FIG. 2, the glass plate 1 is formed in a triangular shape whose outline is constituted by an upper side 11, a front side 12, and a lower side 13. The upper side 11 is slightly curved and is inclined downward as it extends toward the rear side. The front side 12 is configured to face the above-described rear pillar 521 of the rear door 5, and extends substantially linearly from the front end of the upper side 11 and is inclined downward as it extends toward the rear side. The lower side 13 extends from the lower end of the front side 12 while being slightly inclined, and is slightly inclined upward as it extends toward the rear side.

Known glass plates can be used as the glass plate 1, and the glass plate 1 can also be made of heat-ray absorbing glass, regular clear glass or green glass, or UV green glass.

An example of the composition of clear glass, an example of the composition of heat-ray absorbing glass, and an example of the composition of soda-lime based glass are shown below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkali metal)
Total iron oxide ($T\text{-}Fe_2O_3$) in terms of $Fe_2O_3$: 0.08 to 0.14 mass %

Heat-ray Absorbing Glass

With regard to the composition of heat-ray absorbing glass, a composition obtained based on the composition of clear glass by setting the ratio of the total iron oxide ($T\text{-}Fe_2O_3$) in terms of $Fe_2O_3$ to 0.4 to 1.3 mass % the ratio of $CeO_2$ to 0 to 2 mass %, and the ratio of $TiO_2$ to 0 to 0.5 mass % and reducing the components (mainly $SiO_2$ and $Al_2O_3$) forming the framework of glass by an amount corresponding to the increases in $T\text{-}Fe_2O_3$, $CeO_2$, and $TiO_2$ can be used, for example.

Soda-lime Based Glass
$SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide ($T\text{-}Fe_2O_3$) in terms of $Fe_2O_3$: 0.02 to 0.03 mass %

Although there is no particular limitation on the thickness of the glass plate 1 according to this embodiment, the thickness is preferably set to 2.4 to 7.0 mm, and more preferably 2.8 to 5.0 mm.

A blocking layer 15 made of ceramic of a dark color such as black is stacked on the peripheral edge portion of the glass plate 1. This blocking layer 15 blocks a field of vision from the inside and the outside of the vehicle. The blocking layer 15 is stacked on the inner surface of the glass plate 1 and extends along the three sides thereof.

Although various materials such as ceramic can be used to form the blocking layer 15, the composition listed below can be used, for example.

TABLE 1

|  |  | First and second colored ceramics pastes |
|---|---|---|
| Pigment *1 | mass % | 20 |
| Resin (cellulose resin) | mass % | 10 |
| Organic solvent (pine oil) | mass % | 10 |
| Glass binder *2 | mass % | 65 |
| Viscosity | dPs | 150 |

*1 Main components: copper oxide, chromium oxide, iron oxide, and manganese oxide
*2 Main components: bismuth borosilicate, zinc borosilicate Although the ceramic can be formed using a screen printing process, it can also be produced, instead of the screen printing process, by transferring a transfer film for firing to the glass plate and firing the film. If screen printing is employed, the screen printing can be performed under the conditions that a polyester screen of 355 mesh is used, the coating thickness is 20 µm, the tension is 20 Nm, the squeegee hardness is 80 degrees, the attachment angle is 75°, and the printing speed is 300 mm/s, for example, and the ceramic can be formed by performing drying in a drying furnace at 150° C. for 10 minutes.

The blocking layer 15 can also be formed by bonding a resin blocking film of a dark color instead of stacking ceramic.

1-2. Window Assembly

The window assembly 2 fills a gap between the glass plate 1 and the vehicle body, and is formed to extend along the peripheral edge of the glass plate 1. As described above, the blocking layer 15 is stacked on the peripheral edge portion of the glass plate 1, but the window assembly 2 is attached to the peripheral edge of the glass plate 1 and its width (i.e., length in a direction extending inward from the edge of the glass plate 1) is smaller than the width of the blocking layer 15. Specifically, as shown in FIGS. 3 and 4, the window assembly 2 includes a belt-shaped inner part 21 and a belt-shaped outer part 22 that respectively extend along the inner surface of the glass plate 1 and the outer surface of the glass plate 1 as viewed in a cross section such that the peripheral edge of the glass plate 1 is sandwiched therebetween, and a coupling part 23 that extends along the end surface of the glass plate 1 and couples the inner part 21 and the outer part 22 to each other. Thus, the window assembly 2 has a U-shaped cross section as a whole. It should be noted that the inner part 21 is arranged on the blocking layer 15.

The thickness of the window assembly 2, that is, a thickness D in the thickness direction of the glass plate 1, is preferably 3 mm to 20 mm, and more preferably 3 mm to 8 mm. A surface of the inner part 21 that faces the vehicle interior side is a flat surface. A width W of this flat surface is preferably 2 mm to 40 mm, and more preferably 4 mm to 20 mm.

When the glass plate module 10 is attached to the vehicle body, the window assembly 2 is fixed to the peripheral edge of the opening of the attachment recessed portion 81 using an adhesive so as to cover the opening with the glass plate 1.

There is no particular limitation on a material for forming the window assembly 2, and TPO (olefin-based thermoplastic elastomer) can be used to form the window assembly 2, for example. Instead of TPO, PVC (polyvinyl chloride) or EPDM (ethylene-propylene-diene copolymer rubber) can also be used to form the window assembly 2, for example.

1-3. Molding Portion

Next, the molding portion 3 will be described. As shown in FIGS. 2 and 3, the molding portion 3 is provided extending along the front side 12 of the glass plate 1, and includes a belt-shaped fixing portion 31 that is attached to the inner part 21 of the window assembly 2, a leg portion 32 that extends from the edge on the vehicle front side of the fixing portion 31 toward the inside of the vehicle, and a molding portion main body 33 that is attached to the edge on the vehicle interior side of the leg portion 32. The fixing portion 31, the leg portion 32, and the molding portion main body 33 are formed in one piece using a material, which will be described later.

The fixing portion 31 includes a flat surface 312 that extends along the first part 21 of the window assembly 2, and this flat surface 312 is fixed to the inner part 21 using double-sided adhesive tape 7. It should be noted that the flat surface 312 can also be fixed to the inner part 21 using an adhesive instead of the double-sided adhesive tape 7. A rib 311 that extends along the front side 12 of the glass plate 1 is formed on a surface of the fixing portion 31 that faces the vehicle interior side, and this rib 311 is in contact with the attachment recessed portion 81 of the vehicle body.

The leg portion 32 is provided extending along the linking portion 83 of the vehicle body from the fixing portion 31 toward the vehicle interior side. It should be noted that the fixing portion 31 and the leg portion 32 correspond to the coupling portion of the present invention.

The molding portion main body 33 is formed in a tubular shape provided with a through hole 335 that extends along the front side 12 of the glass plate 1. Specifically, a first part 331, a second part 332, and a third part 333 are formed in one piece to provide the molding portion main body 33, and, as viewed in a cross section, the first part 331 is a flat part that extends along the door arrangement portion 82 from the end portion of the leg portion 32 toward the rear door 5 side (vehicle front side), the second part 332 extends from the end portion of the first part 331 toward the vehicle exterior side while being curved protruding toward the rear door 5 side, and the third part 333 extends from the end portion on the vehicle exterior side of the second part 332 toward the vehicle interior side and is coupled to the leg portion 32.

Two ribs 334 that extend parallel to each other along the front side 12 of the glass plate 1 are formed on a surface of the third part 333 that faces the door arrangement portion 82 side, and these ribs 334 are in contact with the door arrangement portion 82. A cutout portion 336 that extends along the front side 12 of the glass plate 1 is formed in the inner wall surface of the second part 332 in the through hole 335 of the molding portion main body 33.

The thus-formed molding portion main body 33 protrudes from the door arrangement portion 82 toward the vehicle exterior side. The end portion on the vehicle exterior side of the molding portion main body 33, that is, the portion where the second part 332 and the third part 333 are coupled to each other, is arranged at substantially the same position as the position of the window assembly 2, and the rear pillar 521 comes into contact with this portion when the rear door 5 is closed. More specifically, as shown in FIG. 4, the rear door 5 is closed such that the rear pillar 521 flattens the molding portion main body 33.

Although there is no particular limitation on the dimensions of the molding portion 3, the dimensions can be set as described below, for example.

(1) The width of the flat surface 312 is preferably 1 mm to 40 mm, and more preferably 2 mm to 20 mm. The reason for this is that the width of less than 2 mm may be smaller than the width of the double-sided adhesive tape 7.

(2) The width of the double-sided adhesive tape 7 for bonding the inner part 21 and the flat surface 312 together is preferably 3 mm to 40 mm, and more preferably 4 mm to 10 mm, from the viewpoint of adhesiveness.

(3) The heights of the ribs 331 and 334 are preferably 0.1 mm to 5 mm, and more preferably 0.5 mm to 3 mm.

(4) The height of the leg portion 32 (i.e., length in a direction in which the leg portion 32 couples the fixing portion 31 and the molding portion main body 33) is preferably 2 mm to 20 mm, and more preferably 4 mm to 10 mm. The reason for this is that, since the thickness of the leg portion 32 is generally approximately 2 mm, the leg portion cannot be formed if the height is 2 mm or less, and sufficient rigidity is not ensured if the height is 20 mm or more.

(5) The thickness of the molding portion 3, that is, the thickness of each of the fixing portion 31, the leg portion 32, and the molding portion main body 33, is preferably 1 mm to 5 mm, and more preferably 1.5 mm to 3 mm. The reason for this is that it is difficult to perform molding if the thickness is 1 mm or less.

(6) The width of the cutout portion 336 is preferably 0.1 mm to 2 mm, and more preferably 0.2 mm to 1.0 mm. The depth of the cutout portion 336 is preferably 0.1 mm to 1.0 mm, and more preferably 0.2 mm to 0.5 mm. The reason for this is that the portion provided with the cutout portion 336 is too thin if the cutout portion 336 is too deep, and resin is less likely to flow during molding, thus making it difficult to perform molding.

(7) The height of the molding portion 3 (i.e., height in the vertical direction in FIG. 3) is preferably 5 mm to 40 mm, and more preferably 15 mm to 30 mm.

Although there is no particular limitation on a material for forming the molding portion 3, it is preferable to use a soft material such as EPDM (ethylene-propylene-diene copolymer rubber) to form the molding portion 3. In particular, it is preferable to use foamable EPDM to form the molding portion 3.

An abrasion-resistant coating such as a silicone slip coating may be applied to the outer surface of the molding portion 3. The thickness of this coating can be set to 1 μm to 50 μm, for example.

Such a molding portion 3 can be produced using various methods. For example, if the molding portion 3 is divided into three portions, namely an upper end portion, a central portion, and a lower end portion, in the longitudinal direction (vertical direction), the molding portion 3 can be formed by forming the upper end and the lower end through injection molding and the central portion through extrusion molding, and then coupling them to each other through thermal fusion bonding or using an adhesive. All the portions can be bonded to the window assembly 2 by providing the bonding surfaces 312 thereto. This makes it possible to adjust the gap between the rear pillar 521 and the window assembly 2. For example, if the gap between the rear pillar 521 and the window assembly 2 varies between the positions at which the upper end portion and the lower end portion are arranged and the position at which the central portion is arranged, these three portions can be coupled to each other after the thicknesses of the portions are adjusted. It should be noted that, since the upper end and the lower end of the molding portion 3 are free ends, a reinforcement made of metal (e.g., SUS430 or SUS304) or the like can also be attached to the upper end and the lower end for the purpose of improving the rigidity.

1-4. Fixing Protrusion

As shown in FIG. 2, two fixing protrusions 41 and 42 are attached to a surface of the glass plate module 10 that faces the vehicle interior side. Specifically, a first fixing protrusion 41 is attached to a portion near the position at which the front side 12 and upper side 11 of the glass plate 1 intersect, and a second fixing protrusion 42 is attached to a portion near the position at which the upper side 11 and the lower side 13 intersect. Both of the fixing protrusions 41 and 42 are attached to a weather strip 2. These fixing protrusions 41 and 42 are configured to be fitted into attachment holes (not shown) that are formed at the peripheral edge of the opening of the attachment recessed portion 81 of the vehicle body. When the window assembly 2 is fixed to the attachment recessed portion 81 using an adhesive, this configuration functions to temporarily attach the window assembly 2 to the attachment recessed portion 81 until the adhesive dries.

2. Features

As describe above, with this embodiment, the following effects can be obtained.

(1) Since the molding portion main body 33 is formed in a tubular shape provided with the through hole 335, when the door 5 is closed and the rear pillar 521 hits the molding portion 3, the molding portion main body 33 is flattened due to the deformation of the through hole 335 as shown in FIG. 4, and the molding portion main body 33 can thus absorb impact caused by the door 5 hitting the molding portion 3. That is, the molding portion main body 33 is easily deformed when the rear pillar 521 hits the molding portion main body 33, thus making it possible to reduce door collision noise.

(2) Since the cutout portion 336 is formed in the inner wall surface of the through hole 335 of the molding portion main body 33, the inner wall surface of the through hole 335 can be easily deformed. Accordingly, reaction force generated by the deformation of the molding portion main body 333 can be reduced, thus making it possible to further reduce the collision noise.

(3) The molding portion 3 is made of a soft material such as EPDM and is thus easily deformed, thus making it possible to reduce collision noise.

(4) The molding portion main body 33 is not directly connected to the window assembly 2, but the fixing portion 31 fixed to the window assembly 2 via the leg portion 32 is coupled to the molding portion main body 33 via the leg portion 32 instead. Accordingly, when the molding portion main body 33 is deformed, it is possible to prevent the double-sided adhesive tape 7 from coming off due to force generated by the deformation. In particular, the leg portion 32 extends substantially in a direction orthogonal to the fixing portion 31, thus making it possible to prevent force acting on the molding portion main body 33 from acting thereon in a direction in which the fixing portion 31 comes off.

(5) Since the shape of the molding portion main body 33 varies, the gap between the door arrangement portion 82 and the molding portion main body 33 may vary. To address this, providing the ribs 334 makes it possible to fix the position of the molding main body 33, particularly the hollow portion 335, to some extent. Moreover, the ribs 334 prevent the molding portion main body 33 and the door arrangement portion 82 from being in direct contact with each other, and frictional resistance between the molding portion main body 33 and the door arrangement portion 82 is thus suppressed. Accordingly, suppressing the frictional resistance between the molding portion main body 33 and the door arrangement portion 82 makes it possible to reduce reaction force generated by the molding portion main body 33 when the door 5 is closed, and to prevent unusual noise as well. The same applies to the rib 311 of the fixing portion 31.

(6) An abrasion-resistant coating is applied to the molding portion 3, thus making it possible to suppress abrasion of the molding portion 3 even if the molding portion 3 receives impact from the door many times. Therefore, impact resistance of the molding portion 3 can be maintained.

(7) Both of the inner part 21 of the window assembly 2 and the fixing portion 31 of the molding portion 3, which are bonded together, are flat surfaces, thus making it possible to firmly bond them together.

3. Modified Examples

Although the embodiment of the present invention has been described above, the present invention is not limited to the above-mentioned embodiment, and various modifications can be carried out without departing from the gist of the invention. Moreover, modified examples below can be implemented in combination as appropriate.

3-1

There is no particular limitation on a material for forming the molding portion 3, but a deformable soft material is preferable. Therefore, a foamable resin material can be used in general, for example.

3-2

There is no particular limitation on the shape of the glass plate 1, and the shape can be selected from various shapes such as a polygonal shape and a circular shape instead of a triangular shape as mentioned above. The window assembly 2 is arranged at the peripheral edge of such a glass plate 1. It is sufficient that the molding portion 3 is provided to a portion of the window assembly 2 at a position at which the molding portion 3 comes into contact with the door that is opened and closed.

3-3

Although the fixing portion 31 and the leg portion 32 are provided in the molding portion 3 in the above-mentioned embodiment, at least the molding portion main body 33 provided with the through hole 335 need only be provided, and the fixing portion 31 or leg portion 32 are not necessarily needed as long as the molding portion main body 33 is attached to the window assembly 2 so as to come into contact with the closed door. Also, the ribs 311 and 334 are not necessarily needed, and either of these ribs need only be provided as necessary. For example, only the ribs 334 may be provided without providing the rib 311.

3-4

There is no particular limitation on the cross-sectional shape of the molding portion main body 33, and various cross-sectional shapes are possible as long as the through hole 335 is formed to be deformed when the door hits the molding portion main body 33. Therefore, a plurality of cutout portions 336 may be provided, or no cutout portion 336 may be provided.

Furthermore, the outline of the cross-sectional shape of the molding portion main body 33 may be the same as or different from the cross-sectional shape of the through hole 335.

Figure 5:
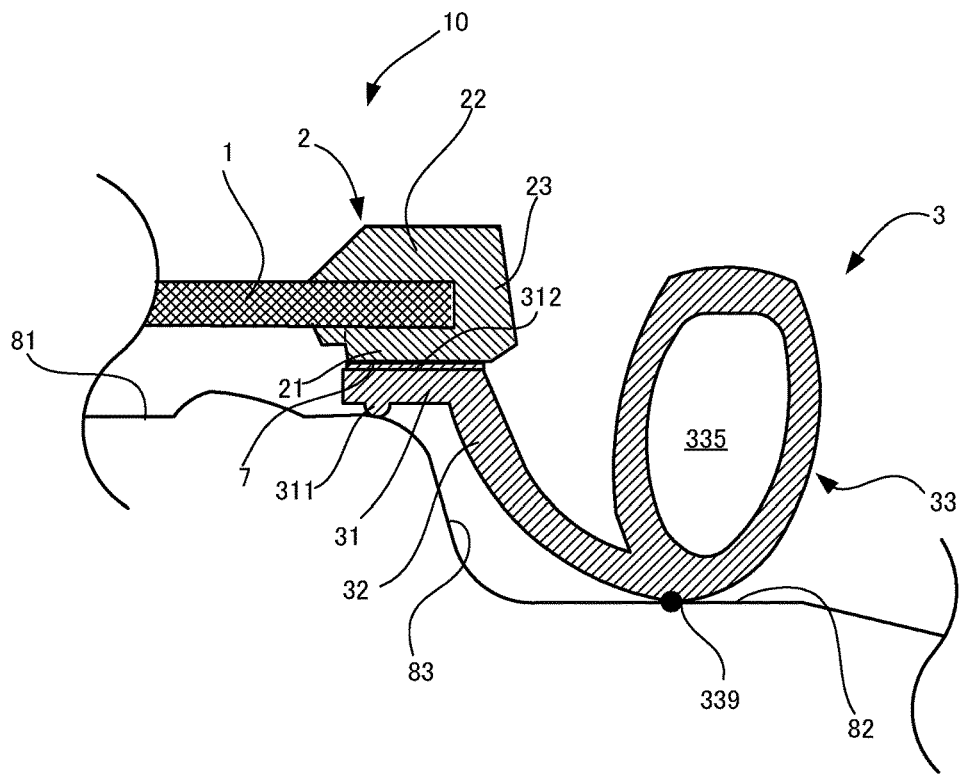
FIG. 5 is a cross-sectional view taken along line A-A in FIG. 2 in a state in which the door is open, showing another example.

For example, the molding portion main body 33 can be formed as described below. This example will be described with reference to FIGS. 5 and 6. It should be noted that this example is different from the molding portion 3 shown in the above-mentioned embodiment mainly in the shape of the molding portion main body 33, and therefore, only the difference will be described hereinafter. As shown in FIG. 5, the molding portion main body 33 of this example is formed in a tubular shape provided with the through hole 335 that extends along the front side 12 of the glass plate 1. More specifically, the molding portion main body 33 is formed such that its cross section has an elliptical outline, and the through hole 335 also has an elliptical shape. A portion of this molding portion main body 33 that is located near the coupling portion where the molding portion main body 33 and the leg portion 32 are coupled to each other is in contact with the door arrangement portion 82, and extends protruding from this door arrangement portion 82 toward the vehicle exterior side. That is, the longer axis of the ellipse of the molding portion main body 33 extends so as to be orthogonal to the door arrangement portion 82.

Figure 6:
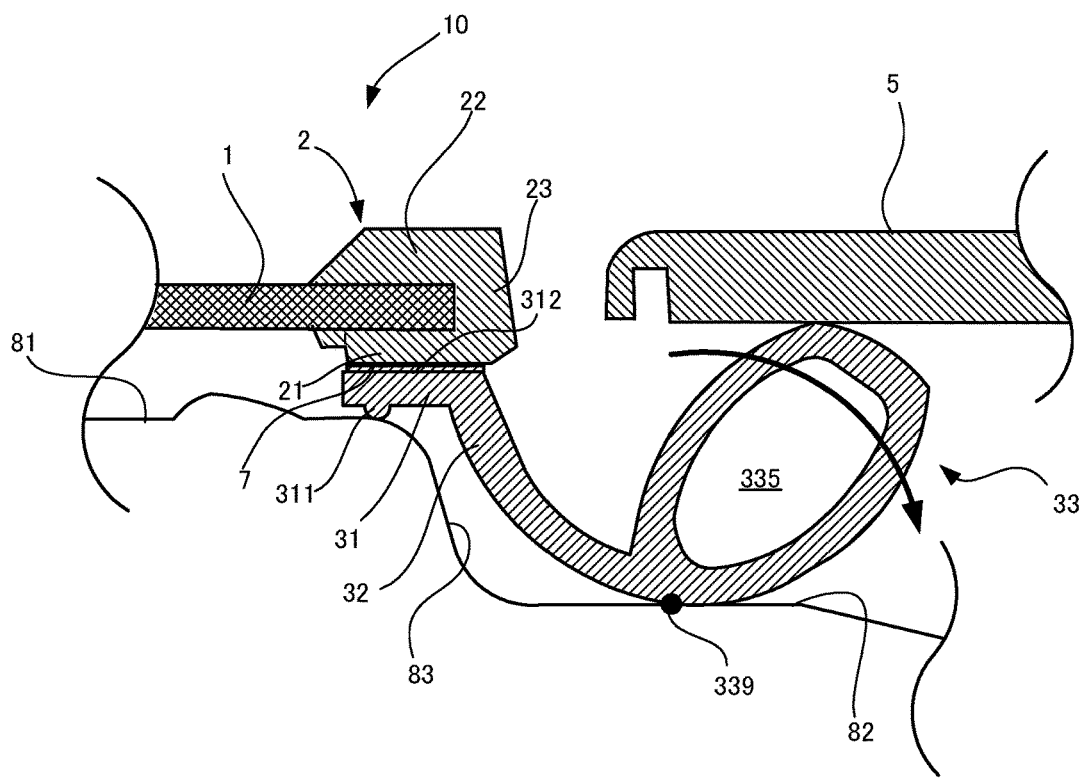
FIG. 6 is a cross-sectional view taken along line A-A in FIG. 2 in a state in which the door is closed, showing another example.

A portion of the molding portion main body 33 that is the farthest from the door arrangement portion 82 is arranged at substantially the same position as the position of the window assembly 2, and the rear pillar 521 comes into contact with this portion when the rear door 5 is closed. More specifically, as shown in FIG. 6, the rear pillar 521 presses the molding portion main body 33, and the molding portion main body 33 is thus inclined in the direction in which the molding portion main body 33 moves away from the window assembly 2 about a contact point 339 at which the molding portion main body 33 is in contact with the door arrangement portion 82. In this manner, the rear door 5 is closed in the state in which the molding portion main body 33 is sandwiched between the door 5 and the door arrangement portion 82. It should be noted that the molding portion main body 33 is not only inclined but also pressed by the door 5 to be slightly flattened.

With the molding portion main body 33 having such a configuration, impact noise caused when the door 5 is closed can also be reduced as in the case of the above-mentioned embodiment. As described above, since the molding portion main body 33 is provided with the through hole 335, impact can be reduced due to the molding portion main body 33 being flattened by the door 5. In addition, since the molding portion main body 33 is moved (e.g., pressed and inclined as in the above-mentioned example) and thus transmits impact, impact noise can be reduced.

3-5

Although the above-mentioned embodiments have a configuration in which the glass plate module 10 is arranged on the rear side of the rear door and the molding portion 3 comes into contact with the rear pillar of the rear door, there is no limitation to this configuration. That is, the glass plate module according to the present invention reduces impact noise caused when a door that can be opened and closed is closed, and therefore, there is no particular limitation on the application position as long as the glass plate module is arranged at a position at which the glass plate module comes into contact with the door, which can be opened and closed, when the door is closed.

LIST OF REFERENCE NUMERALS

1 Glass plate
2 Window assembly
3 Molding portion
312 Flat surface
32 Leg portion
33 Molding portion main body
336 Cutout portion
311, 334 Rib

The invention claimed is:

1. A glass plate module to be attached at a position adjacent to a door of a vehicle that can be opened and closed, the glass plate module comprising:
  a glass plate;
  a window assembly that is fixed to a peripheral edge of the glass plate; and
  a molding portion that includes a tubular molding portion main body provided with a through hole extending along the window assembly and that is fixed to the window assembly,
  wherein the molding portion main body is configured to come into contact with a door arrangement portion where at least a part of the door which is closed is configured to be disposed,
  the molding portion further includes a coupling portion for connecting the molding portion main body with the window assembly, and
  when the molding portion main body contacts a part of the door which is closed, the molding portion main body is configured to be flattened while the molding portion main body pivots about a contact point, at which the molding portion main body is in contact with the door arrangement portion no matter when the door is open or closed, in a direction in which the molding portion main body moves away from the window assembly such that an angle formed between the molding portion main body and the coupling portion increases.

2. The glass plate module according to claim 1,
wherein the coupling portion includes a fixing portion attached to the window assembly, and
the fixing portion includes a rib which is configured to contact the vehicle body.

3. The glass plate module according to claim 1,
wherein the coupling portion includes a fixing portion attached to the window assembly,
the fixing portion includes a flat surface that extends along the window assembly, and
the window assembly includes a flat surface to which the flat surface of the fixing portion is bonded.

4. The glass plate module according to claim 1, wherein the molding portion is made of a foamable material.

5. The glass plate module according to claim 1, wherein an abrasion-resistant coating is applied to the molding portion.

6. The glass plate module according to claim 1, wherein an outline of the cross-sectional shape of the molding portion main body has a triangular shape.

7. The glass plate module according to claim 1, wherein an outline of the cross-sectional shape of the molding portion main body has an elliptical shape.

* * * * *